Nov. 10, 1959   O. E. ANDRUS   2,912,551
METHOD AND APPARATUS FOR BONDING LAMINATED STRUCTURES
Filed July 31, 1957
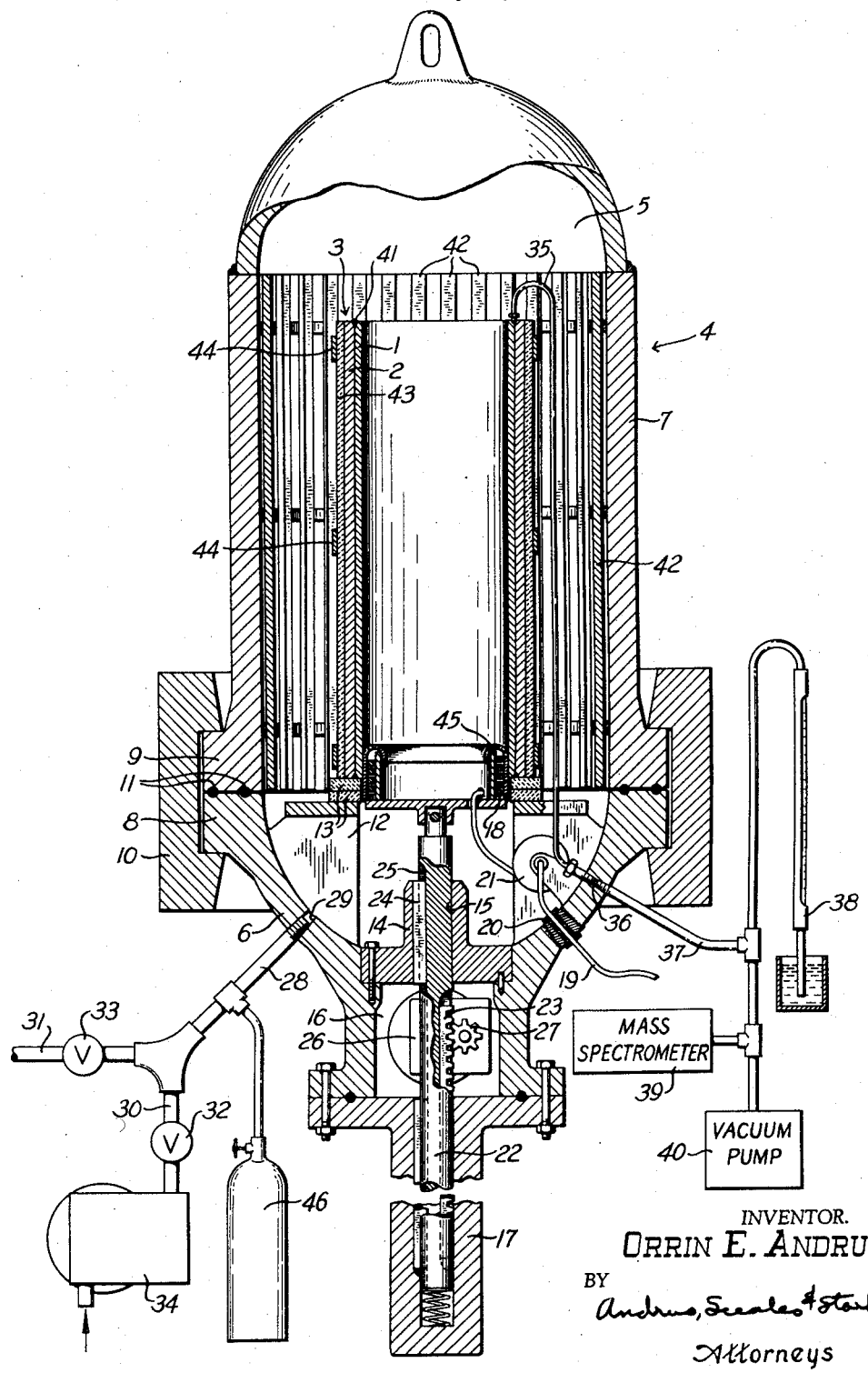
INVENTOR.
ORRIN E. ANDRUS
BY
Andrus, Scales & Starke
Attorneys

United States Patent Office 2,912,551
Patented Nov. 10, 1959

2,912,551

METHOD AND APPARATUS FOR BONDING LAMINATED STRUCTURES

Orrin E. Andrus, Madison, Wis., assignor to A. O. Smith Corporation, Milwaukee, Wis., a corporation of New York Application July 31, 1957, Serial No. 675,469

6 Claims. (Cl. 219—9.5)

This invention relates to a method and apparatus for bonding composite metal articles, and more particularly to the bonding of a liner sheet to a base plate by application of electrical induction heating and fluid pressure.

Heretofore, it has generally been the practice to bond a composite plate structure by hermetically sealing together the edges of the members making up the composite plate structure, furnace heating the structure to welding temperature, and then rolling the structure at welding temperature. This method presents certain economic and technical problems and is limited to the fabrication of flat structures.

The furnace heating for preparing the composite structure for rolling requires a long period of time at high temperature which fosters undesirable grain growth, carbon migration, and carbide precipitation. The large grain size may be reduced by subsequent rolling within temperature limits, providing the initial and final thickness limits of the composite structure allow for adequate reduction. Carbon migration from the base plate to the alloy liner being a time temperature phenomenon, becomes troublesome the longer the structure is kept at high temperature. To lessen the precipitation of carbides in the liner it has been necessary to use expensive additives such as columbium and titanium to stabilize the carbides. In other cases it has been necessary to furnace heat the rolled lined plate to a high temperature and then quench to hold the carbon in solid solution in the alloy. In so doing, problems of grain growth, warping and acquisition of stresses may be encountered.

Because the plasticities of the alloy liner and carbon steel base plate are not the same at the rolling temperature, varying deformation in the members occurs from the center to the edge of the structure resulting in a non-uniform thickness of the liner member. It is, therefore, generally necessary to accept a structure having non-uniform liner thickness. It has been necessary to crop large portions of the composite structure to remove those areas in which the liner thickness is excessive. The result of this practice is a necessary addition to the cost of the structure for material and labor.

In general, the present invention is directed to a method and apparatus for bonding a liner sheet member to a base metal member by application of electrical induction heating to the composite structure disposed within a fluid under high pressure.

More specifically according to this invention, a liner sheet member is disposed flatwise against a base metal member and the members are hermetically sealed together to form a composite structure. To bond the members together the composite structure is placed within a chamber and subjected to fluid pressure to force the separate members into more intimate contact over their facing surfaces and then to progressively heat the structure by electric resistance means. The order and duration of heating and pressure application may be varied to suit the particular case.

The present invention produces a continuously bonded composite structure having a liner of uniform or predetermined thickness throughout its surface area. As the time required for heating and bonding is relatively short, the usual subsequent operations such as reheating and rolling are not necessary to improve the metallurgical characteristics of the bonded structure.

The drawing furnished herewith illustrates the best mode of carrying out the invention as presently contemplated and set forth hereinafter.

In the drawing the lone figure is a diagrammatic side elevation partially in section showing the apparatus for carrying out the method of this invention.

Referring to the drawing, the method of the invention is shown and described as employed in the bonding of a cylindrical liner member 1 disposed in flatwise relation to a concentric cylindrical base plate structure 2 to form a composite shell 3 for a lined vessel, not shown.

The apparatus for performing the method of the invention includes the pressure vessel 4 which provides a bonding chamber 5 therewithin. The vessel 4 is comprised of a fixed lower portion 6 and a removable closed shell portion 7. The vessel portions 6 and 7 are each provided with complementary flanges 8 and 9, respectively, which are secured together by the movable split clamp ring 10. A series of O-rings 11 may be disposed between the flanges 8 and 9 to seal the chamber.

A plurality of support members 12 extend upwardly from the lower vessel portion 6 within the bonding chamber 5 to provide a support for the composite shell 3 to be bonded. One or more layers of ceramic brick 13 are disposed on each member 12 to thermally and electrically insulate the support members from the shell 3.

The lower portion 6 of the vessel is provided with an upwardly extending tubular boss 14 centrally of the vessel and an axial bore or opening 15 extends therethrough. A chamber 16 for the gear box and motor is provided beneath the vessel portion 6 and communicates with the bonding chamber 5 through opening 15. A tubular guide well 17 extends downwardly from motor chamber 16 and is vertically aligned with opening 15 of the vessel.

A water-cooled induction heating coil 18 is disposed within the bonding chamber 5 for vertical reciprocation with respect to the composite shell 3. The power and coolant for coil 18 are supplied through the coaxial cable 19 which enters the bonding chamber 5 through the stuffing gland 20 and is wound on the spring loaded reel 21. The coil 18 is carried vertically within the shell 3 by the cylindrical rod 22 which extends downwardly from the bonding chamber through opening 15, and motor chamber 16 into the well 17.

The coil carrying rod 22 is formed with a vertically extending rack 23 to provide means for moving the coil 18 vertically. A radial projection 24 is provided within the well 17 and opening 15. A complementary groove 25 provided in rod 22 receives the projection 24 and prevents rotation of the rod within the well 17 and opening 15 as the rod is moved vertically to actuate the coil 18.

A variable speed submersible motor-gear reducer set 26 is disposed in motor chamber 16 and drives the pinion gear 27 to actuate the rack 23. Operation of the motor drives the rack and moves coil 18 at the desired speed with respect to the shell 3.

The conduit 28 is connected to an opening 29 in the lower portion 6 of vessel 4 and provides means for introducing a pressure fluid into the bonding chamber 5 and for exhausting the chamber. The end of conduit 28 opposite from vessel 4 is forked to receive an inlet pipe 30 and an outlet pipe 31. Pipes 30 and 31 are provided with closure valves 32 and 33, respectively, for controlling the flow of pressure fluid to and from the bonding chamber 5. Means 34 such as a pump or compressor is connected to a source of pressure fluid, not shown, and is disposed in the inlet line 30 outwardly from closure valve 32.

A vent conduit 35 extends downwardly within the bonding chamber 5 and is connected to an opening 36 in the lower portion 6 of vessel 4. The upper end of conduit 35 is adapted to be connected with the void between the liner member 1 and base plate member 2 of shell 3. An extension 37 of conduit 35 extends outwardly from the vessel 4 and is connected respectively wtih a manometer 38 and a mass spectrometer 39. A vacuum pump 40 is provided on the end of extension 37 and serves to evacuate the residual and evolved gases or vapors from the void between the members 1 and 2. The manometer 38 serves to indicate the pressure condition in the void and further operates as a relief valve when and if the pressure in the void exceeds the safe working pressure of the vacuum pump 40 and the mass spectrometer 39.

To carry out the method of the invention, the cylindrical base plate structure 2 is formed from one or more plate sections which are cleaned and otherwise prepared for bonding. Liner sheet material which has been cleaned and otherwise prepared is arranged in contiguous flatwise relation with respect to the cylindrical base plate structure 2 to form the concentric liner member 1. At times it may be desirable to interpose a thin sheet or a layer of plating between the members 1 and 2 to facilitate welding.

Having been prepared in the manner described and assembled in concentric relation, the liner sheet 1 and base plate 2 are then hermetically sealed together by fusion edge welds 41 to form the composite shell structure 3. Where the liner sheet member 1 is comprised of a plurality of sections, not shown, each is fusion welded to the base plate 2 and provision is made to interconnect the resulting voids by passages, not shown. The included void or voids between the liner sheet 1 and base plate 2 are preferably either substantially evacuated of air or purged with a neutral or reducing medium to minimize oxidation and scaling on the bonding surfaces.

The composite structure 3 to be bonded is then placed on the support members 12 of the open vessel. The spacing between the shell 3 to be bonded and the wall of vessel 4 must be adequate or provision must be made for a magnetic shield 42 therebetween to minimize induced heating currents in vessel 4. After the shell structure 3 has been positioned on supports 12, vent conduit 35 is placed in communication with the void between the shell members 1 and 2.

The transfer of heat from a surface by convection becomes much more pronounced as the pressure of the contacting atmosphere is multiplied. Because of this fact it is generally necessary to minimize the convection losses to the pressure fluid in contact with the heating surfaces. A blanket 43 of fibrous aluminum silicate or the like may be secured on the outside of the composite structure 3 by means of non-conducting bands 44 and serves to confine the heat to the area being heated by minimizing heat loss from the surface and transfer of heat locally through the pressure fluid to the wall of the bonding chamber, and also to control the rate of cooling of the bonded structure. An insulating layer 45 carried by coil 18 and disposed between the coil and composite structure 3 serves a similar purpose and also to protect the coil from the heat generated in the shell 3.

The shell portion 7 of pressure vessel 4 is then assembled and clamped to the lower fixed portion 6 to enclose the composite structure 3 within the bonding chamber 5. The pressure fluid is introduced into the chamber to force the liner and base plate into intimate contact. Examples of suitable pressure fluids include water, steam, air, flue gas, nitrogen, helium and argon. These fluids possess varying degrees of inertness with respect to the metals to be bonded. Their choice will generally be governed by the effect of the fluid on the materials to be bonded and the relative costs of the fluid as compared to the cost of removing any surface corrosion resulting from their use. Generally, water or air may be used where some scaling will not be objectionable in the end product. Flue gas and nitrogen may normally be used in applications where water or air are too corrosive. A fluid like argon or helium must be used when the metal to be clad reacts vigorously with nitrogen, water, air or the like. Where desired the bonding installation may include means for reclaiming all or any portion of the pressure fluid for reuse.

According to the drawing, the pressure fluid is forced into the bonding chamber by means 34 such as a pump or compressor until the desired pressure has been attained. Where a liquid such as water is utilized as the pressure fluid, there is a decided advantage over a gas so employed in that water is plentiful and therefore relatively cheap and the pumping or compressing costs are only a fraction of that for compressing a gas. Further, the kinetic energy stored in a liquid under pressure is considerably less than that for a gas at the same pressure so that utilizing a liquid such as water is safer and makes it possible to employ a thinner walled bonding chamber to reduce the cost of the bonding installation. With certain fluids such as nitrogen, the desired pressure may be obtained by vaporizing liquified nitrogen, thereby eliminating the need for a compressor unit. The pressure within the bonding chamber necessary to effect a good bond between the liner 1 and base plate 2 should be adequate to force the members into substantially intimate contact and may vary in accordance with the bonding temperature, the time required for heating, the materials to be bonded, the type of bond to be made, and the rate of cooling subsequent to bonding. Pressures up to 5,000 p.s.i. have been employed. However, good bonds have been attained in the range between 2,000 and 3,000 p.s.i.

It is essential to the method of the invention that fusion welds 41 be essentially leak-tight so that the external pressure may be relied upon to force the liner sheet 1 into more intimate contact with the base plate 2. If a leak develops in welds 41, the pressure differential between the gases in the void and the pressure fluid external to the shell is partially or wholly destroyed and a good bond between the members is impossible. It, therefore, becomes advantageous to know the condition and content of the atmosphere in the void between the members during the entire bonding operation.

The pressure of the gases in the void between the members 1 and 2 as shown on manometer 38 may be expected to increase to a degree as the pressure on the outside of the members is increased to force the members into more intimate contact. Further, the heating required for bonding may be expected to expand the gases within the void and may evolve hydrogen and/or other gases in solution in the members to thereby increase the pressure. Thus, the readings of increased pressure as shown from time to time on the manometer 38 may not always be indicative of a leak from the surrounding pressure fluid. For this reason a detector fluid may be dissolved in or mixed with the pressure fluid and the content of the atmosphere in the void as determined by the mass spectrometer 39 becomes important. In the event a leak develops in the weld 41, pressure fluid including the detector fluid will rush into the void. Not only will manometer 38 show an increase in pressure in the void, but the mass spectrometer 39 will indicate the presence of detector fluid which ordinarily should not be present in the void or should be present in lesser amounts. These instruments, therefore, indicate whether the conditions are right for attaining a good bond between the members.

After the desired pressure is obtained within the bonding chamber 5 to force the liner member and base plate member into more intimate contact, electrical induction heating is utilized to bond the members together progressively. As shown in the drawing, the coil 18 is used to induce a heating current into the composite structure 3 to be bonded and is moved progressively from the bottom of the structure to the top. Generally, the bonding temperature will be 100–200° F. below the lowest melting point of either member 1 or 2. Where metallurgical changes in the material, such as grain growth, require a lower bonding temperature, it may be necessary to employ a pressure above the more usual 2,000–3,000 p.s.i. range to attain a good bond.

The time required for heating and bonding a local band or increment of area or length at the interface between members of the composite structure will generally vary in the range from less than one minute to five minutes depending on the materials being bonded, their thickness and other factors. Coil 18 is advanced progressively in either intermittent steps or continuously to heat and bond successive local bands or increments of the structure.

As the heating coil 18 is progressively advanced to bond successive bands or increments of the composite structure 3, controlled rapid cooling of the bonded portion of the structure is desirous to minimize undersirable metallurgical phenomena occurring in the bonded structure such as grain growth, carbon migration and carbide precipitation. The bonded portion of structure 3 is quenched at a relatively rapid rate by the pressure fluid in the usual range of 2,000–3,000 p.s.i. When a gas is employed as the pressure fluid and more rapid cooling is desired, the bonding chamber may be outfitted so that water or other coolant may be introduced into the chamber in accordance with the speed of the advancing coil. When water is utilized as the quenching medium, provision must be made to permit the displaced pressure fluid to exit from the bonding chamber so that the working pressure within the bonding chamber is maintained substantially constant.

While the method of the invention is particularly adapted for cladding cylindrical structures, the method is also applicable for flat plates and other structures. If a particular band or area of the composite structure is to remain unbonded for any reason, an oxide coating may be applied to the interface of the members in the desired band or area to prevent bonding while all other bands or areas are bonded.

As an illustration of an application of the invention, a stainless steel liner member 7/64 inch thick of type 304L was bonded to a carbon steel base plate member ¼ inch thick of type A–212. The members were cleaned and prepared for bonding and sealed together in superposed relation to form a composite structure. The void therebetween was exhausted to a vacuum (or pressure) of 80 microns. The composite structure was then placed in a chamber and fluid pressure of 2,200 p.s.i. forced the members into more intimate contact. While the fusion temperatures of the carbon steel and stainless steel were about 2,800° F. and 2,560° F., respectively, the composite structure was heated to a bonding temperature of 2,200° F. and the temperature was maintained for two minutes at each increment of the structure. The bond was uniform throughout the interface of the members and the shear strengths of the carbon steel and stainless steel individually was about 45,000 p.s.i. and 48,000 p.s.i., respectively. An A.S.T.M. shear test applied to the composite structure showed the bond to have 100% of the shear strength of the carbon steel.

In a similar structure and with Monel metal used as a liner, a pressure of 2,000 p.s.i. was applied to the composite structure and a temperature of 2,000° F. was maintained for five minutes. The bond shear strength was 48,200 p.s.i.

Using Inconel metal for the liner member, and applying a pressure of 2,000 p.s.i. to the composite structure, the bond was made at 2,000° F. maintained for two minutes. The bond shear strength was 56,800 p.s.i.

Using silver for the liner member on a carbon steel base plate, a pressure of 2,000 p.s.i. was applied to the sealed composite structure. With the fusion temperature of silver being about 1760° F., a bonding temperature of 1600° F. was maintained for two minutes. The shear strength of silver was about 10,400 p.s.i. The A.S.T.M. shear test applied to the composite structure showed the bond to have a shear strength equal to that of the original silver.

Various modes of carrying out the invention are contemplated as being within the scope of the following claims particularly pointing out and distinctly claiming the subject matter which is regarded as the invention.

I claim:

1. A method of fabricating a composite metal structure, which comprises assembling at least a pair of members in contiguous flatwise relation, sealing said members together along the edges thereof to provide a structure having a void between adjacent members, supporting the sealed members within a closed chamber, venting the void by placing one end of the void between adjacent members in communication with the outside of the closed chamber, introducing a detector fluid into the closed chamber, introducing a pressure fluid into the closed chamber to force the members into more intimate contact at their facing surfaces and expel a substantial portion of the atmosphere in the void between adjacent members, progressively heating successive increments of the sealed structure to a bonding temperature progressing from the end of the structure opposite from the end being vented to bond the members together while at the same time confining the heat to the increment being heated, and during bonding sampling the atmosphere being expelled from the void between adjacent members to detect any leakage of fluid from said chamber into said void between the adjacent members.

2. A method of fabricating a composite metal structure, which comprises assembling a liner member in flatwise engagement with a base plate member, sealing said members together along the edges thereof to provide a structure having a void therebetween, supporting the sealed structure within a closed chamber, evacuating the void between the members from one end of the structure to remove gases therefrom having a deleterious effect on the subsequent bonding operation, introducing a detector fluid into the closed chamber, introducing a pressure fluid into the closed chamber to force the members into more intimate contact at their facing surfaces, progressively heating successive increments of the sealed structure to a bonding temperature progressing from the end of the structure opposite from the end at which the void is being evacuated to bond the members together while at the same time confining the heat to the increment being heated, said heat and pressure imposing stresses on the sealed members tending to break the seal therebetween and leak the pressure fluid together with the detector fluid into the void between the members and thereby prevent a successful bond, and evacuating said void and sampling the atmosphere being withdrawn therefrom during bonding to be assured of the relative absence of the detector fluid indicating that the seal remains unbroken and the pressure differential acting on the members has been maintained.

3. A method of fabricating a composite metal structure, which comprises assembling a liner member in flatwise engagement with a base plate member, sealing said members together along the edges thereof to provide a structure having a void therebetween, supporting the sealed structure within a closed chamber, evacuating the void between the members from one end of the structure to remove gases therefrom having a deleterious effect on the subsequent bonding operation, pumping water into the closed chamber to a pressure in excess of 2,000 p.s.i. to force the members into more intimate contact at their facing surfaces, introducing a detector fluid into the closed chamber with said water, progressively heating successive increments of the sealed structure to a bonding temperature progressing from the end of the structure opposite from the end at which the void is being evacuated to bond the members together while at the same time confining the heat to the increment being heated, said heat and pressure imposing stresses on the sealed members tending to break the seal therebetween and leak the pressure fluid together with the detector fluid into the void between the members and thereby prevent a successful bond, and evacuating said void and sampling the atmosphere being withdrawn therefrom during bonding to be assured of the relative absence of the detector fluid in the void indicating that the seal remains unbroken and the pressure differential acting on the members has been maintained.

4. Apparatus of the class described for bonding a composite workpiece comprising two plate-like members disposed face to face and welded along an edge seam to seal the intermediate surfaces from the surrounding atmosphere, said apparatus comprising a fluid pressure chamber having a removable portion to provide for the insertion of the workpiece within the chamber, means to support the workpiece within the chamber, an induction heating element disposed adjacent the exposed surfaces of the workpiece, heat insulating means extending between said element and the exposed surfaces of the workpiece, means to apply high fluid pressure within said chamber to urge the members into more intimate contact for bonding, means to energize the heating element to inductively heat the intermediate surfaces of the members in the region adjacent to the heating element, and means to effect relative movement between the heating element and the workpiece to progressively heat and bond successive regions of the workpiece to effect a complete bonding between the intermediate surfaces of the members, the heat insulation means between the heating element and the workpiece serving to minimize the flow of convection currents between the element and workpiece and thereby conserve the heat within the region of the workpiece being bonded until bonding is effected, the bonded regions of the workpiece being progressively uncovered by the relative movement between the heating element and workpiece and thereby providing for rapid cooling of the bonded regions by the fluid within the chamber.

5. Apparatus of the class described for bonding two or more metal sheets or plate members disposed face to face, comprising a fluid pressure chamber having a removable head providing an opening for inserting the workpiece, means to support the workpiece within the chamber with the members thereof in substantially continuous surface contact and welded to each other along an edge seam to seal the intermediate surfaces from the surrounding media within the chamber, heat insulation material covering the exposed surface of one of said members, a high frequency induction heating element disposed adjacent the exposed surface of the opposite of said members, heat insulation carried by said heating element and extending between it and the adjacent surface of the workpiece, means to apply high fluid pressure within said chamber to urge said workpiece members into pressure engagement for bonding the same, means to energize said heating element to inductively heat the members of the workpiece in the region adjacent to said element, and means within the chamber to move said heating element relative to the workpiece to progressively heat successive regions of the workpiece from one end thereof to the other to effect a complete bonding of the members together, the insulation between said heating element and the workpiece serving to cover the adjacent workpiece surface and prevent substantial heating of the fluid within the chamber by contact with the immediate surface of the workpiece adjacent said heating element, to thereby conserve the heat within the workpiece until the bonding is effected, and the progressive movement of the heating element serving to uncover the adjacent surface of the workpiece whereby the latter is progressively cooled by the fluid within the chamber.

6. Apparatus of the class described for bonding a composite workpiece comprising at least two plate-like members disposed face to face and welded along an edge seam to seal the intermediate surfaces from the surrounding atmosphere and form a void therebetween, said apparatus comprising a fluid pressure chamber having a removable portion to provide for the insertion of the workpiece within the chamber, means to support the workpiece within the chamber, heat insulation material covering the exposed surface of one of said members, an induction heating element disposed adjacent the exposed surface of the opposite of said members, heat insulation means carried by said heating element and extending between said element and the adjacent surface of the workpiece, vent means connected to the void at one end of the workpiece to place the void in communication with the atmosphere outside of said chamber, means to apply high fluid pressure within said chamber to urge the members into more intimate contact for bonding, means to energize the heating element to inductively heat the members of the workpiece in the region adjacent to said element, and means to effect relative movement between the heating element and workpiece to progressively heat and bond successive regions of the workpiece in the direction of the vent connection to effect a complete bonding of the intermediate surfaces of the members, the heat insulating means between the heating element and the workpiece serving to minimize the flow of convection currents between the element and workpiece and thereby conserve the heat within the region of the workpiece adjacent to the heating element until bonding is effected, and the progressive movement of the heating element serving to uncover the adjacent bonded portion of the workpiece whereby the latter is rapidly cooled by the fluid within the chamber.

References Cited in the file of this patent

UNITED STATES PATENTS

| | | |
|---|---|---|
| 1,845,322 | Neuhauss | Feb. 16, 1932 |
| 2,438,155 | Diller | Mar. 23, 1948 |
| 2,478,037 | Brennan | Aug. 2, 1949 |
| 2,484,613 | Detuno | Oct. 11, 1949 |
| 2,807,697 | Brauer et al. | Sept. 24, 1957 |